United States Patent [19]

Willis et al.

[11] Patent Number: 4,882,384

[45] Date of Patent: Nov. 21, 1989

[54] MODIFIED BLOCK COPOLYMERS

[75] Inventors: Carl L. Willis; Steven S. Chin, both of Houston, Tex.

[73] Assignee: Shell Oil Company, Houston, Tex.

[21] Appl. No.: 150,579

[22] Filed: Feb. 1, 1988

[51] Int. Cl.$^4$ .................... C08F 8/42; C08L 53/02
[52] U.S. Cl. .................... 525/105; 525/106; 525/314; 525/337; 525/342; 525/366
[58] Field of Search ............ 525/105, 342, 366, 314, 525/337

[56] References Cited

U.S. PATENT DOCUMENTS

| | | | |
|---|---|---|---|
| 3,976,628 | 8/1976 | Halasa et al. | 525/250 |
| 4,185,042 | 1/1980 | Verkouw | 525/332 |
| 4,409,357 | 10/1983 | Milkovich | 525/271 |
| 4,471,099 | 9/1984 | Trepka | 525/366 |
| 4,556,464 | 12/1985 | St. Clair | 204/159.15 |
| 4,704,438 | 11/1987 | Niwa et al. | 525/333.3 |

FOREIGN PATENT DOCUMENTS

| | | | |
|---|---|---|---|
| 0073715 | 6/1980 | Japan | 525/105 |
| 58-132032A | 8/1983 | Japan . | |
| 58-225103A | 12/1983 | Japan . | |

OTHER PUBLICATIONS

Jean M. Frechet and Conrad Schuerch, "Solid-Phase Synthesis of Oligosaccharides, I. Preparation of the Solid Support, Poly [p-(1-propen-3-ol-1-yl)styrene]," Journal of the American Chemical Society /93:2/Jan. 27, 1971, pp. 492–496.

Thomas M. Fyles and Clifford C. Leznoff, "The Use of Polymer Supports in Organic Synthesis, V. The Preparation of Monoacetates of Symmetrical Diols," Can. J. Chem., vol. 54, 1976, pp. 935–942.

"Abnormal Reactions of Polystyrene Metalated with Butyllithium–N,N,N',N'-Tetramethylethylenediamine," Journal of Polymer Science, Polymer Letters, Part B, vol. 6, No. 9, Sep. 1968, pp. 649–651.

M. Jean Farrall and Jean M. J. Frechet, "Bromination and Lithiation: Two Important Steps in the Functionalization of Polystyrene Resins", J. Org. Chem., vol. 41, No. 24, 1976, pp. 3877–3882.

"Carbon-13 Nuclear Magnetic Resonance Spectra of Methyl Substituted Polystyrenes," Journal of Polymer Science, Polymer Letters Edition, vol. 12, pp. 199–202 (1974).

Primary Examiner—Wilbert J. Briggs, Sr.
Attorney, Agent, or Firm—Keith M. Tackett

[57] ABSTRACT

A thermoplastic polymer having good tensile strength at elevated temperatures is obtained by modifying a block copolymer composed of a conjugated diene compound and an alkenyl arene compound. The block copolymer is first selectively hydrogenated and thereafter modified by grafting silicon or boron containing functional groups primarily in the alkenyl arene block via metalation. Each silicon containing functional group preferably contains at least two functional groups which allow crosslinking by condensation reactions.

20 Claims, No Drawings

MODIFIED BLOCK COPOLYMERS

FIELD OF THE INVENTION

This invention relates to novel selectively hydrogenated functionalized block copolymers. More particularly, it relates to a novel crosslinkable block copolymer with excellent mechanical properties primarily at elevated temperatures. The polymer is obtained by modifying a block copolymer composed of a selectively hydrogenated conjugated diene compound and an alkenyl arene compound with a silicon or boron containing functional group grafted primarily in the alkenyl arene block.

BACKGROUND OF THE INVENTION

It is known that a block copolymer can be obtained by an anionic copolymerization of a conjugated diene compound and an alkenyl arene compound by using an organic alkali metal initiator. Block copolymers have been produced, see U.S. Pat. No. Re. 27,145, which comprise primarily those having a general structure A—B or A—B—A wherein the polymer blocks A comprise thermoplastic polymer blocks of alkenyl arenes such as polystyrene, while blocks B are polymer blocks of a selectively hydrogenated conjugated diene. The proportion of the thermoplastic terminal blocks to the center elastomeric polymer block and the relative molecular weights of each of these blocks is balanced to obtain a rubber having unique performance characteristics. In such a rubber having a volume ratio of blocks B to blocks A much greater than 1, the blocks A are thermodynamically incompatible with the blocks B resulting in a rubber consisting of two phases; a continuous elastomeric phase (blocks B) and a basically discontinuous hard, glass-like plastic phase (blocks A) called domains. These domains act as physical crosslinks anchoring the ends of many block copolymer chains.

As A—B block copolymers have only one A block, the strength of such polymers is derived primarily from the inherent entanglements of the various B blocks therein. However, since the A—B—A block copolymers have two A blocks separated by a B block, domain formation results in effectively locking the B blocks and their inherent entanglements in place by the A blocks and forming a network structure. Such a phenomena allows the A—B—A rubber to behave like a conventionally vulcanized rubber that contains dispersed reactive filler particles. These thermoplastic A—B—A rubbers are physically crosslinked by the domains in a network structure as opposed to being chemically crosslinked like a conventionally vulcanized rubber. Since both the network forming (e.g., A—B—A) and non-network forming (e.g., A—B) polymers are thermoplastic in nature, they may be handled in thermoplastic forming equipment and are soluble in a variety of relatively low cost solvents. This is in contrast to polymers which are chemically crosslinked and can not be reversibly processed.

These types of block copolymers are diversified in characteristics, depending on the content of the alkenyl arene compound. When the content of the alkenyl arene compound is small, the produced block copolymer is a so-called thermoplastic rubber. It is a very useful polymer which shows rubber elasticity in the non-vulcanized state and is applicable for various uses such as moldings of shoe sole, etc.; impact modifier for polystyrene resins and engineering thermoplastics; in adhesive and binder formulations; modifications of asphalt; etc. The non-network forming polymers have found particular utility as viscosity index improvers (U.S. Pat. Nos. 3,700,748; 3,763,044; 3,772,196; 3,965,019; and 4,036,910). Non-network forming polymers are also utilized in adhesive and binder formulations and as modifiers or plasticizers for polystyrene resins and engineering thermoplastics.

Network forming block copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

While in general these block copolymers have a number of outstanding technical advantages, one of their principal limitations lies in their sensitivity to oxidation. This behavior is due to the unsaturation present in the center section comprising the polymeric diene block. Oxidation may be minimized by selectively hydrogenating the copolymer in the diene block, for example, as disclosed in U.S. Pat. No. Re. 27,145. Prior to hydrogenation, the block copolymers have an A—B or A—B—A molecular structure wherein each of the A's is an alkenyl-arene polymer block and B is a conjugated diene polymer block, preferably a butadiene polymer block containing 35–55 mole percent of the condensed butadiene units in a 1,2 configuration.

Both the network forming and non-network forming block copolymers are deficient in many applications in which the retention of properties at elevated temperatures and deformation resistance are required. Non-network forming copolymers are especially deficient in applications in which good mechanical integrity and deformation resistance are required even at room temperatures. In such copolymers, the mechanical integrity of the block copolymers is limited to the integrity of the soft phase (B blocks) since each elastomeric blocks is chemically bound to only one polystyrene domain.

At room temperature, the network forming copolymers are known to have particularly high tensile strengths due to the formation of glassy phase arene block domains which act as physical entanglements within the rubbery B block matrix. The mechanical integrity of these domains appears to control the tensile strengths of these copolymers. At elevated temperatures or in combination with oils, the mechanical integrity of block copolymers are limited to the integrity of the hard phase arene block domains. For example, copolymers having arene blocks of polystyrene have poor mechanical properties at high temperature which may be attributed to the weakening of the polystyrene domains above the polystyrene glass transition temperature (Tg) of 100° C. Improvements in the high temperature characteristics of these block copolymers may be achieved by enhancing the integrity of the alkenyl arene domains to higher temperatures.

These selectively hydrogenated, hydrocarbon A—B—A block copolymers are further deficient in many applications in which interactions are required between it and other materials. Applications in which improvements in adhesion charcteristics may promote improved performance include (1) the toughening of, and dispersion in, polar polymers such as the engineering thermoplastics; (2) the adhesion to high energy substrates in a hydrogenated block copolymer elastomer based high temperature adhesive, sealant or coating; and (3) the use of hydrogenated elastomers in reinforced polymer systems. The placement of functional groups onto the block copolymer may provide interactions not possible with hydrocarbon polymers and, hence, may extend the range of applicability of this material.

Many attempts have been made to improve adhesive characteristics, green strength and other properties by modifying block copolymers with acid compounds, particularly, network forming block copolymers having at least two A blocks and at least one B block. To this end, various methods have been proposed for modifying the polymer with acid moieties, for example, Saito et al. in U.S. Pat. Nos. 4,292,414 and 4,308,353; Hergenrother et al. in U.S. Pat. No. 4,427,828; and Gergen et al. in U.S. Pat. No. 4,578,429. In each case, such modified block copolymers contain functional (acid) moieties only in the diene block. Specifically, Saito et al. and Hergenrother et al. attach anhydride moieties to a partially hydrogenated monovinyl arene/conjugated diene block copolymer by the so-called "ENE" reaction. Gergen et al. describe a block copolymer which is a thermally stable, selectively hydrogenated, high 1,2 content substituted vinyl arene/conjugated diene block copolymer grafted with at least one functional (anhydride) moiety at a secondary or tertiary carbon position via a free radical initiated reaction.

Silicon containing functional groups have also been grafted to the diene blocks of block copolymers as described in U.S. patent application Ser. No. 136,622, filed Dec. 22, 1987, now U.S. Pat. No. 4,822,857. Specifically, silicon compounds having at least one vinyl group are grafted to the diene blocks with some cleaving of the diene blocks using free radical extruder grafting.

However, such modified block copolymers do not take advantage of the arene block domain phenomena. Furthermore, the elastomeric properties of the polymer may be adversely altered by modifying or functionalizing the polymer B block. Thus, focusing on improving the high temperature capabilities of the block copolymer, it is necessary that the functional groups be grafted primarily in the arene block, A, such as is disclosed in copending U.S. patent applications Ser. Nos. 766,217 and 079,380, now U.S. Pat. No. 4,868,245.

SUMMARY OF THE INVENTION

According to the present invention, there is provided a thermally stable, selectively hydrogenated, high 1,2 content block copolymer to which a silicon or boron containing compound, preferably an alkoxysilane compound, has been grafted primarily in the alkenyl arene block. The alkenyl arene block domains are preferably crosslinked by a condensation reaction. The degree of crosslinking can be controlled by controlling the amount of silicon containing compound.

More specifically, there is provided a functionalized selectively hydrogenated block copolymer to which has been grafted a silicon containing compound. The copolymer has (a) at least one alkenyl arene polymer A block and
(b) at least one substantially completely hydrogenated conjugated diene B block which is molecularly attached to the A block,
(c) wherein silicon or boron containing compounds are grafted to the copolymer primarily in the A blocks.

The grafted silicon or boron compound is preferably present at between about an average of one functional group per copolymer molecule and about an average of one functional group per aromatic ring of the A block. Each of these grafted silicon or boron containing compounds contains at least one moisture curing functional group such as alkoxy, acetoxy, or oximido-containing groups, preferably alkoxy groups, which can be chemically crosslinked by condensation reactions. The grafted silicon or boron containing functional groups preferably contain multiple alkoxy groups for crosslinking of the alkenyl arene domains. Furthermore, the copolymer may be linear or branched, with the term "branched" also including symmetric or asymmetric radial and star structures.

Preferably, there is provided the functionalized selectively hydrogenated block copolymer and the article of manufacture as defined above, wherein (a) each of the A blocks prior to hydrogenation in predominantly a polymerized monoalkenyl monocyclic arene block having an average molecular weight of about 1,000 to about 115,000,
(b) each of the B blocks prior to hydrogenation is predominantly a polymerized conjugated diene block having an average weight of about 10,000 to about 450,000,
(c) the A blocks constitute about 1 to about 99 percent by weight of the copolymer,
(d) the unsaturation of the B blocks is less than about 10 percent of the original unsaturation of the B blocks,
(e) the unsaturation of the A blocks is greater than about 50 percent of the original unsaturation of the A blocks, and
(f) the silicon containing compound is preferably present at between about an average of one functional group per polymer molecule and about an average of one functional group per aromatic ring of the A block.

The feature of this invention lies in providing modified block copolymers which are thermally stable; have a low residual unsaturation; are processable in solution and/or in the melt; have excellent mechanical properties especially at elevated temperatures, such as tensile stength and, deformation resistance; etc. The article of manufacture consisting essentially of this modified block copolymer also possesses these excellent mechanical properties.

Accordingly, those and other features and advantages of the present invention will become apparent from the following detailed description.

DETAILED DESCRIPTION OF THE INVENTION

Selectively Hydrogenated Block Copolymer Base Polymer

The block copolymers employed herein may have a variety of geometrical structures, since the invention does not depend on any specific geometrical structure. The base block copolymers employed in the present composition are preferably thermoplastic elastomers and have at least one alkenyl arene polymer end block A and at least one elastomeric conjugated diene polymer mid block B. The number of blocks in the block copolymer is not of special importance and the macromolecular configuration may be lienar or branched, which includes graft, radical or star configurations, depending upon the method by which the block copolymer is formed. The radical or star configuration may be either symmetric or asymmetric. Typical examples of the bare block copolymers would have the following structures:

(A—B)n
(A—B)nA
(B—A)nB
[(A—B)p]mX
[(B—A)p]mX
[(A—B)pA]mX and
[(B—A)pB]mX wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 20. Furthermore, the above-mentioned branched configurations may be either symmetrical or asymmetrical with respect to the blocks radiating from X.

The preferred base block copolymers have demonstrated utility in the present invention and have the structures:

polystyrene-hydrogenated polybutadiene-polystyrene (S—EB—S), and polystyrene-hydrogenated polyisoprene-polystyrene (S—EP—S).

It will be understood that both blocks A and B may be either homopolymer, random or tapered copolymer blocks as long as each block predominates in at least one class of the monomers characterizing the blocks defined herein before. Thus, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homologs including alpha-methylstyrene and other ring alkylated styrenes, particularly ring-methylated styrenes, and other monoalkenyl polycyclic aromatic compounds such as vinyl naphthalene, vinyl anthracene, and the like. The preferred monoalkenyl arenes are styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: 1,3-butadiene (butadiene), 2-methyl-1,3-butadiene (isoprene), 2,3-dimethyl-1,3-butadiene, 1,3-pentadiene (piperylene), and 1,3-hexadiene, preferably butadiene and isoprene.

Preferably, the block copolymers of conjugated dienes and alkenyl arenes which may be utilized include any of those materials which have 1,2-microstructure contents prior to hydrogenation of from about 7% to about 100%, most preferably from about 35% to about 55%. Such block copolymers may contain various ratios of conjugated dienes of alkenyl arenes. The proportion of the alkenyl arene blocks is between about 1 and about 99 percent by weight of the multiblock copolymer. To exhibit elastomeric properties, the proportion of the alkenyl arene blocks in these block copolymers is between preferably about 2 and about 65 percent, and more preferably about 2 and about 40 percent by weight.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 12,000 to about 700,000, preferably from about 12,000 to about 270,000. These molecular weights are most accurately determined by gel permeation chromatography.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparations of multiblock copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosure of which patents are incorporated herein by reference.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are selectively hydrogenated in the B blocks to promote selective functionalization of the A blocks and to increase their thermal stability and resistance to oxidation. The hydrogenation of these polymers and copolymers may be carried out by a variety of well established processes including hydrogenation in the presence of such catalyst as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of not more than about 5 percent, preferably not more than 2 percent, of their original unsaturation content prior to hydrogenation as measured by ozonalysis.

Modified Block Copolymers

The modified block copolymers according to the present invention are grafted or substituted in the alkenyl arene block by the metalation process as described in copending U.S. patent application Ser. Nos. 766,622, now abandoned and 079,380 which are incorporated herein by reference. Exemplary reactions are given below:

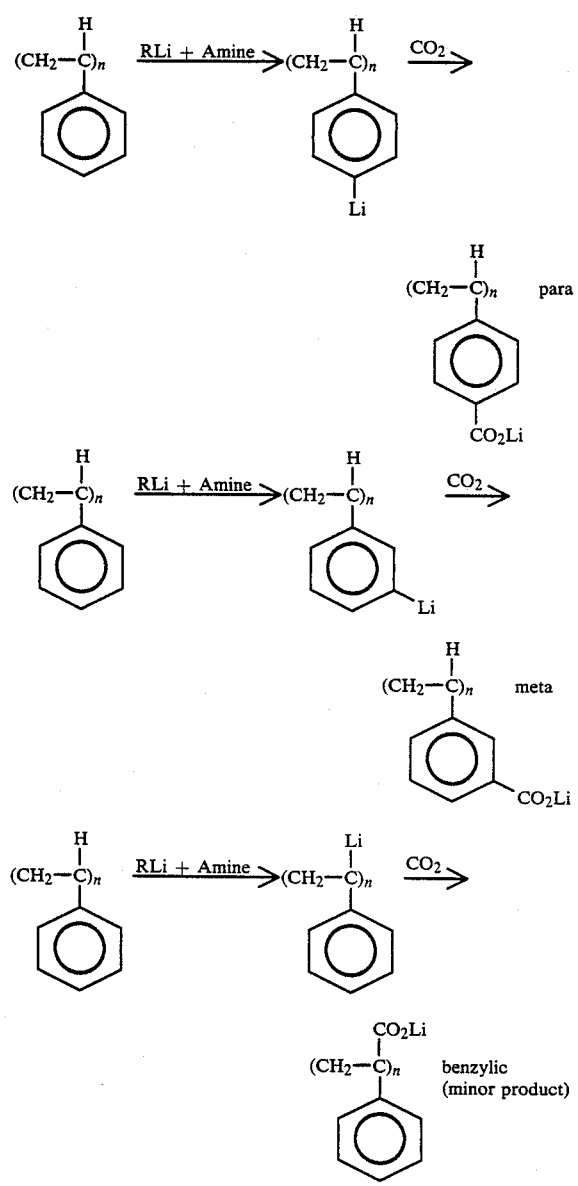

Where: RLi=Alkyl Lithium

The structure of the substituted block copolymer specifically determined by the location of the functionality on the alkenyl arene block gives the block copolymer a substantially greater degree of thermal stability.

Graftable Compounds

In general, any electrophile having the ability to react with the metalated base polymer can be grafted to the base polymer. For the present invention, the graftable compounds are silicon containing compounds that have at least one functional group that is capable of reacting with the metalated base polymer, preferably a halogen group or an alkoxy group, most preferably chloro, methoxy, or ethoxy groups. The graftable silicon compounds preferably also have at least one additional functional group that is capable of curing the modified block copolymer by condensation reactions. The preferred additional functional groups are alkoxy, acetoxy, and oximido groups, most preferably methoxy, ethoxy, and acetoxy groups. Other non-reactive groups may be present between the silicon atom and the functional groups described above, e.g. methylene or phenylene.

The preferred silicon compounds which will form graft polymers within the scope of the present invention include the following: siloxanes, halosilanes, halosiloxanes, acetoxy siloxanes, acetoxy halosilanes, oximido siloxanes, and oximido halosilanes. Examples of some preferred commercially available silicon compounds include:

2-acetoxyethyldimethylchlorosilane,
3-acetoxypropyldimethylchlorosilane,
chloromethyldimehylethoxysilane,
dimethylmethoxychlorosilane,
chloromethylenemethyldiethoxysilane,
3-chloropropylmethyldimethoxysilane,
chlorotriethoxysilane,
dimethyldiethoxysilane,
tetraethoxysilane,
3-chloropropyltrimethoxysilane, and
chlorophenylenetriethoxysilane.

The preferred silicon compounds are readily curable by condensation reactions and specifically include chlorotriethoxysilane, dimethyldiethoxysilane, and tetraethoxysilane.

The quantity of molecular units having silicon containing functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. This minimum and maximum functionality level corresponds to about an average of one silicon containing functional group per polymer molecule and about an average of one silicon containing functional group per cyclic ring of the A block, respectively. It is currently believed that the average of one addition per cyclic ring is limiting.

Boron containing homologs for the above-described silicon containing compounds are expected to be operable in the present invention although it is expected that crosslinking of the boron containing functional groups as described below will be reversible under some conditions.

Crosslinking of Modified Block Copolymer

The modified block copolymers of the present invention may be "crosslinked" in the presence of a condensation catalyst, such as dibutyltindilaurate (DBTDL), when at least one alkoxy, acetoxy, or oximido functional group, preferably alkoxy group, remains on the grafted silicon compound. Moisture curing of the crosslinkable block copolymer provides improved high temperature properties and deformation resistance in comparison to the base block copolymer or non-crosslinked, modified block copolymer.

The improvement in the high temperature properties and deformation resistance resulting from the crosslinking of the A block domains is greatly influenced by the degree of crosslinking and, therefore, the number of the crosslinks per A block and the nature of the crosslink involved. This phenomena is true so long as the modified block copolymer remains processable from the solution or melt state.

The degree of silicon containing functionality and of crosslinking may be measured by several techniques. For example, neutron activation analysis may be employed to determine the overall degree of functionality.

The block copolymers, as modified, may still be used for any purpose for which an unmodified material (base polymer) was formerly used. That is, they may be used for adhesives and sealants, or compounded and extruded and molded in any convenient manner.

Preparation of the Modified Block Copolymers

The polymers are preferably prepared by the metalation procedure as described in copending U.S. application Ser. No. 766,622 (K-4723) which is herein incorporated by reference. Therein, the functional groups are primarily incorporated into the block copolymer primarily on the aromatic portion of the alkenyl arene block via metalation.

Metalation may be carried out by means of a complex formed by the combination of a lithium component, which can be represented by $R'(Li)_x$, with a polar metalation promoter. The polar compound and the lithium component can be added separately or can be premixed or pre-reacted to form an adduct prior to addition to the solution of the hydrogenated copolymer. In the compounds represented by $R'(Li)_x$, the R' is usually a saturated hydrocarbon radical of any length whatsoever, but ordinarily containing up to 20 carbon atoms, and can also be an aromatic radical such as phenyl, naphyl, tolyl, 2-methylnapthyl, etc., or a saturated cyclic hydrocarbon radical of e.g. 5 to 7 carbon atoms, a mono-unsaturated cyclic hydrocarbon radical of 5 to 7 carbon atoms, a non-conjugated, unsaturated aliphatic hydrocarbon radical of 1 to 20 carbon atoms, or an alkyllithium having one or more aromatic groups on the alkyl group, the alkyl group containing 1 to 20 carbon atoms. In the formula $R'(Li)_x$, x is an integer of 1 to 3. Representative species include, for example: methyllithium, isopropyllithium, sec-butyllithium, n-butyllithium, t-butyllithium, n-dodecyllithium, 1,4-dilithiobutane, 1,3,5-trilithiopentane, and the like. The lithium alkyls must be more basic than the product metalated alkyl. Of course, other alkali metal or alkaline earth metal alkyls may also be used; however, the lithium alkyls are presently preferred due to their ready commercial availability. In a similar way, metal hydrides may also be employed as the metalation reagent but the hydrides have only limited solubility in the appropriate solvents. Therefore, the metal alkyls are preferred for their greater solubility which makes them easier to process.

Lithium compounds alone usually metalate copolymers containing aromatic and olefinic functional groups with considerable difficulty and under high temperatures which may tend to degrade the copolymer. However, in the presence of tertiary diamines and bridgehead monoamines, metalation proceeds rapidly and smoothly.

Generally, the lithium metalates the position allylic to the double bonds in an unsaturated polymer. In the metalation of polymers in which there are both olefinic and aromatic groups, the metalation will occur in the position in which metalation occurs most readily, as in positions (1) allylic to the double bond, (2) at a carbon to which an aromatic is attached, (3) in an aromatic group, or (4) in more than one of these positions. In the metalation of saturated polymers having aromatic groups as is preferably the case herein, the metalation will occur primarily in an aromatic group and as a minor product at a carbon to which an aromatic is attached. In any event, it has been shown that a very large number of lithium atoms are positioned variously along the polymer chain, attached to internal carbon atoms away from the polymer terminal carbon atoms, either along the backbone of the polymer or on groups pendant therefrom, or both, in a manner depending upon the distribution of reactive or lithiatable positions. This chemistry distinguishes the lithiated copolymer from simple terminally reactive polymers prepared by using a lithium or even a polylithium initiator in polymerization thus limiting the number and the location of the positions available for subsequent attachment. With the metalation procedure described herein, the extent of the lithiation will depend upon the amount of metalating agent used and/or the groups available for metalation. The use of a more basic lithium alkyl such as tert-butyl-lithiumalkyl may not require the use of a polar metalation promoter.

The polar compound promoters include a variety of tertiary amines, bridgehead amines, ethers, and metal alkoxides.

The tertiary amines useful in the metalation step have three saturated aliphatic hydrocarbon groups attached to each nitrogen and include, for example:

(a) Chelating tertiary diamines, preferably those of the formula $R_2N-(CH_2)_y-NR_2$ in which each R can be the same or different straight-chained or branched-chain alkyl group of any chain length containing up to 20 carbon atoms or more all of which are included herein and y can be any whole number from 2 to 10, and particularly the ethylene diamines in which all alkyl substituents are the same. These include, for example: tetramethylethylenediamine, tetraethylethylenediamine, tetradecylenediamine, tetraoctylhexylenediamine, tetra-(mixed alkyl) ethylene diamines, and the like.

(b) Cyclic diamines can be used, such as, for example, the N,N,N',N'-tetraalkyl 1,2-diamino cyclohexanes, the N,N,N',N'-tetraalkyl 1,4-diamino cyclohexanes, N,N'-dimethylpiperazine, and the like.

(c) The useful bridgehead diamines include, for example, sparteine, N,N,N,N'N'N'-triethylenediamine, and the like.

Tertiary monoamines such as triethyldiamine are generally not as effective in the lithiation reaction. However, bridgehead monoamines such as 1-azabicyclo[2.2.2] octane and its substituted homologs are effective.

Ethers and the alkali metal alkoxides are presently less preferred than the chelating amines as activators for the metalation reaction due to somewhat lower levels of incorporation of functional group containing compounds onto the copolymer backbone in the subsequent grafting reaction.

In general, it is most desirable to carry out the lithiation reaction in an inert solvent such as saturated hydrocarbons. Aromatic solvents such as benzene are lithiatable and many interfere with the desired lithiation of the hydrogenated copolymer. The solvent/copolymer weight ratio which is convenient generally is in the range of about 5:1 to 20:1. Solvents such as chlorinated hydrocarbon, ketones, and alcohols, should not be used because they destroy the lithiating compound.

Polar metalation promotors may be present in an amount sufficient to enable metalation to occur, e.g. amounts between 0.01 and 100 or more preferably between 0.1 to about 10 equivalents per equivalent of lithium alkyl.

The equivalents of lithium employed for the desired amount of lithiation generally range from such as about 0.001–3.0 per alkenyl aromatic hydrocarbon unit in the copolymer, presently preferably about 0.01–1.0 equivalents per alkenyl aromatic hydrocarbon unit in the copolymer to be modified.

The amount of lithium alkyl employed can be expressed in terms of the lithium alkyl to alkenyl aromatic hydrocarbon molar ratio. This ratio may range from a value of 1 (one lithium alkyl per alkenyl aromatic hydrocarbon unit) to as low as $1 \times 10^{-3}$ (1 lithium alkyl per 1000 alkenyl aromatic hydrocarbon units).

The process of lithiation can be carried out at temperatures in the range of such as about $-70°$ C. to $+150°$ C., presently preferably in the range of about $25°$ C. to $75°$ C., the upper temperatures being limited by the thermal stability of the lithium compounds. The lower temperatures are limited by considerations of production cost, the rate of reaction becoming unreasonably slow at low temperatures. The length of time necessary to complete the lithiation and subsequent reactions is largely dependent upon mixing conditions and temperature. Generally the time can range from a few seconds to about 72 hours, presently preferably from about 1 minute to 1 hour.

Grafting Step

The next step in the process of preparing the modified block copolymer is the treatment of the lithiated hydrogenated copolymer, in solution, without quenching in any manner which would destroy the lithium sites, with a species capable of reacting with a lithium anion. These species must contain reactive groups capable of undergoing nucleophilic attack by a lithium anion. Such electrophilic species which will react to give polymer bound silicon containing functional groups include but are not limited to:

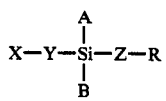

where R is an alkoxy, acetoxy, or oximido-containing group, preferably methoxy or ethoxy groups; A and B are hydrogen, halogens, alkanes, alkoxy, acetoxy, or oximido-containing groups, preferably methoxy or ethoxy groups; X is a reactive group capable of undergoing nucleophilic attack by a lithium ion, preferably chlorine, methoxy, or ethoxy groups; and Y and Z are optional non-reactive groups such as methylene (—CH$_2$—) or phenylene (—C$_6$H$_4$—). The groups A and B can be the same as the group R or the group X and may also contain non-reactive groups such as the groups Y or Z. The structures for some of the preferred functional groups are as follows:

  Alkoxy

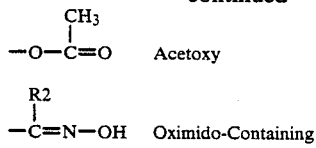

where R1 is an alkane, preferably methane or ethane, and R2 can be hydrogen, carbon, an alkane, or other non-reactive functional group.

To improve the properties of the block copolymers, it is common to add modifiers such as tackifying resins, plasticizers, endblock compatible resins, oxidation/UV stabilizers, and pigments and fillers, such as calcium carbonate, talc, clay, aluminum trihydrate (an accelerator) or zinc oxide (a retarder).

A common tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins, and polymerized mixed olefins. To obtain good ultraviolet resistance, it is preferred that the tackifying resin be a saturated resin, e.g., a hydrogenated dicyclopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varies from about 20 to about 400 parts by weight per hundred parts rubber (phr), preferably between about 100 to about 350 phr.

The plasticizers useful with the present invention include rubber extending plasticizers, compounding oils, and liquid resins. Rubber compounding oils are well-known in the art and include both high satruates content oils and high aromatics content oils. Preferred plasticizers are highly saturated oils, e.g. Tufflo ® 6056 made by Arco. The amount of rubber compounding oil employed in the inventive compositions can vary from 0 to about 100 phr, and preferably between about 0 to about 60 phr.

Optionally, an endblock-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of endlblock compatible resins having high and low softening points may also be used. Useful resins include coumarone-indene resins, polystyrene resins, vinyl toluene-alphamethylstyrene copolymers, and polyindene resins. An alphamethylstyrene resin is most preferred. The amount of endblock-compatible resin can vary from 0 to about 200 phr.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be molded or formed into various kinds of useful articles by using conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes.

To assist those skilled in the art in the practice of this invention, the following Examples are set forth as illustrations. It is to be understood that in the spercification and claims herein, unless otherwise indicated, when amounts are expressed in terms of percent by weight, it is meant percent by weight based on the block copolymer.

In the following Examples, film casts from solution of the block copolymer of the present invention were tested for tensile strength using the following test procedure in the dry-as-cast state.

Tensile Strength:

ASTM-D412 using a shortened "D" dumbbell die (L=1.6 cm as opposed to 3.3 cm). Test specimens were about 0.05 inches in thickness. A crosshead speed of 1 inch per minute was used during testing operations minute. The effective gauge length (i.e., the separation distance between the clamps) was 1.625 inches (40.6 mm). Samples were evaluated on an Instrom 1123 testing machine.

EXAMPLES

Having thus broadly described the present invention, it is believed that the same will become even more apparent by reference to the following examples. The base block copolymers used were the products of selectively hydrogenating a polystyrene-polybutadiene-polystyrene (S—B—S) block copolymer effected by use of a catalyst comprising the reaction products of an aluminum alkyl compound with nickel carboxylates. The base block copolymers have a residual ethylenic unsaturation of less than about 2% of the original unsaturation in the polybutadiene block and have a residual aromatic unsaturation of greater than 95% of the original unsaturation in the polystyrene block. The examples are presented solely for the purposes of illustration and should not be construed as limiting the invention.

EXAMPLE 1

Tetraethoxysilane Silylation Reagent

In this experiment, the base block copolymer was a hydrogenated S—B—S or styrene-ethylene/butylene-styrene triblock copolymer (S—E/B—S) having block molecular weights (number average) of 7,500-35,000-7,500. The base block copolymer was modified with triethoxysilane functional moieties using a lithiation-/alkoxysilylation technique. In a dry box under an inert atmosphere, a solution of the S—E/B—S block copolymer (100 g.) in cyclohexane (1900 g.) was treated with N,N,N',N'-tetramethylenediamine (TMEDA) (2.0 g., 17 mmol), a lithiation promoter. Using 1,1-diphenylethylene as an indicator, the block copolymer solution was titrated with a solution of s-butyllithium in cyclohexane to remove impurities. As the endpoint of the titration, a yellow/orange color persisted in the solution, indicating that the solution was free of reactive impurities. With sitrring, the solution was heated to 60° C. and treated with 7.7 ml of a 1.3 N solution of s-butyllithium (10 mmol). The viscosity of the solution increased rapidly as the lithiation reaction proceeded.

After one hour, the hot reaction mixture was treated with the silylation reagent, 4 g. of tetraethoxysilane (19 mmol of $(EtO)_4Si$) in 36 g. of cyclohexane. The mixture was allowed to cool to room temperature. The alkoxysilylated block copolymer was isolated by coagulation in an excess of ethyl alcohol affording a quantitative yield of a white polymer crumb, Polymer A. Analysis by a neutron activation technique found that Polymer A contained 0.056% w of bound silicon which is about 1 unit of —Si(OEt)$_3$ per polymer chain. On the basis of a molecular weight analysis (gel permeation chromatography (GPC)), it was discovered that a portion of the product had been coupled (23% w). The higher molecular weight fraction of Polymer A likely arose from a subsequent silylation reaction by an aleady grafted —Si(OEt)$_3$ species as follows:

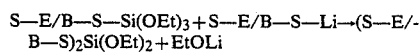

In a control experiment, an aliquot of the S—E/B—S base polymer was lithiated using an analogous lithiation technique. This lithiated polymer was treated with an excess of $D_2O$ placing a deuterium atom on the polymer at sites which had been lithiated. Analysis of the deuterated polymer using a Deuterium NMR technique found that 94% of the deuterium was attached to the aromatic ring segments of the block copolymer at phenyl (89%) and benzylic (5%) positions. Approximately 6% of the deuterium was at allylic sites which likely were in the rubber midblock in the block copolymer. On the basis of these deuterium labelling experiments, it was apparent that the polymer was lithiated principally in the styrene blocks of the S—E/B—S block copolymers. Therefore, the subsequent silylation reaction must have occured primarily in the styrene blocks as well.

EXAMPLE 2

Chlorotriethoxysilane Silylation Reagent

The procedure for Example 1 was modified to impart —Si(OEt)$_3$ moieties to the base block copolymer with chlorotriethoxysilane (3.8 g., 19 mmol) as the alkoxysilylation reagent. The product, Polymer B, had a higher level of —Si(OEt)$_3$ functionality, 2.3 sites per molecule located primarily in the styrene blocks of the polymer, and less coupled product (20% w). The use of ClSi(OEt)$_3$ resulted in an improved product.

EXAMPLE 3

Low Temperature Silylation

The procedure of Example 2 was modified to evaluate the effect of reaction temperature on the degree of coupling in the product. The total reaction size was reduced by 50% for economy, but, aside from that, lithiation of the S—E/B—S polymer proceeded as outlined in Example 2. At the point of departure from Example 2, the lithiated sample was allowed to cool to room temperature before the alkoxysilylation reagent was added (1.9 g., 14 mmol, of chlorotriethoxysilane) at the same ratio as in Example 2. Isolation and analysis of the product, Polymer C, using the procedures reported above, found essentially the same level of functionality as reported in Example 2, i.e. about 2.3 —Si(OEt)$_3$ sites per molecule in Polymer C. Less high molecular weight product was observed with Polymer C having about 14% w coupled polymer.

At a lower temperature, the alkoxysilylation reaction gave a better yield of the desired non-coupled product.

EXAMPLE 4

Effect of Excess Silylation Reagent

The procedure of Example 3 was altered to study the effect of the amount of added alkoxysilylation reagent on the yield of silicon containing functional moieties in the modified block copolymer. The procedure of Example 3 was modified to employ a large excess (10 to 1) to ClSi(OEt)$_3$ relative to the amount of lithiation reagent that was employed (earlier Examples used a ratio of 2 to 1). The higher ratio of alkoxysilylation reagent produced a product, Polymer D, having an increased yield of attached —Si(OEt)$_3$ moieties, about 3.9 sites per molecule. This increase in yield was accomplished with a slight increase in the formation of coupled product to about 17% w from 14% w.

The addition of excess alkoxysilylation reagent afforded a more highly functionalized polymer.

EXAMPLE 5

Dimethyldiethoxysilane Silylation Reagent

The procedure of Example 1 was modified to employ an alternate silylation reagent, dimethyldiethoxysilane Me$_2$Si(OEt)$_2$. In all regards, lithiation proceeded as outlined in Example 1. Addition of Me$_2$Si(OEt)$_2$ (2.8 g., 19 mmol) to the hot, lithiated S—E/B—S polymer afforded a product, Polymer E, having pendant —Si(Me)$_2$OEt functionality. Isolation and analysis as described above found about 3.6 alkoxysilane sites per polymer molecule. Only about 8% w of Polymer E was coupled.

The use of Me$_2$Si(OEt)$_2$ as a functionalization agent gave a high yield of modified sites and a minimum of coupled polymer molecules.

EXAMPLE 6

Effect of Crosslinking

The high molecular weight fractions of Polymers A through E, from Examples 1-5, were eliminated with a standardized gel test. The sample polymers were filtered through a 100 mesh screen from a 1% w toluene solution. The initial gel content of Polymer A was about 5.3% w and was left on the screen for removal. The other polymer samples did not have an initial gel content.

After elimination of the high molecular weight gel fraction, the toluene filtrate containing each sample was cast into 20 mil thick films for crosslinking. The thin films contained 0.1% w dibutyltindilaurate (DBTDL) as a condensation catalyst and were aged in water at 70° C. for 6 hours. The gel content of the crosslinked samples were determined using the procedure described above. The alkoxysilane content and gel content of Polymers A through E are summarized in Table 1. Test results in Table 1 show that endblock silylated S—E/B—S block copolymer is crosslinkable. Furthermore, samples having a high initial gel content crosslinked to a higher gel content. An analysis of the crosslinked gel from Polymer A showed an average of 2.3 alkoxysilane moieties per polymer molecule while the non-crosslinked filtrate contains less than 0.1 alkoxysilane moieties per molecule.

Interestingly, Polymer E which contains a mono-alkoxysilane moiety was not crosslinkable using the test procedure. This suggests that multiple alkoxy groups are more readily crosslinked by condensation reactions than mono-alkoxysilane groups which are expected to crosslink under more stringent conditions.

TABLE 1

| Sample | Functional Group | Functional Groups Per Polymer | Coupled Polymer % w | Gel Content % w Initial | Gel Content % w Crosslinked[a] |
|---|---|---|---|---|---|
| Polymer A | —Si(OEt)$_3$ | 1 | 28 | 5.3 | 44[b] |
| Polymer B | —Si(OEt)$_3$ | 2.3 | 20 | 0 | 37 |
| Polymer C | —Si(OEt)$_3$ | 2.3 | 14 | 0 | 19 |
| Polymer D | —Si(OEt)$_3$ | 3.9 | 17 | 0 | — |
| Polymer E | —Si(Me)$_2$OEt | 3.6 | 8 | 0.1 | 0 |

[a] After filtration of high molecular weight species and aging of 20 mil thick film in 70° C. water for 6 hours.
[b] Toluene insoluble portion contained about 2.3 functional groups per molecule and toluene soluble portion about 0.1 groups per polymer.

In table 2, the tensile properties of Sample A, both crosslinked and non-crosslinked, are compared to the tensile properties of the base block copolymer, Control A, and a free radically silylated base block copolymer, Control B. Tensile properties at elevated temperatures show that crosslinking has little effect at room temperatures but improves tensile strength at elevated temperatures. At 70° C., crosslinked Polymer A and crosslinked Control B have approximately twice the tensile strength of crosslinked Control A, the base block copolymer. At 100° C., Polymer A shows some improvement in tensile strength over both Control A and Control B. The improvement in tensile strength for the modified block copolymers of the present invention has not been correlated to a change in the glass transition temperature of the styrene endblocks as no change in the glass transition temperature has been found.

Surprisingly, the endblock silylated block copolymer of the present invention exhibits good high temperature tensile strength before crosslinking when a small initial gel content is present, i.e. initial Polymer A. This result may be attributed to the high concentration of coupled polymer which is soluble in toluene up to about 1% w.

TABLE 2

| | Gel Content, % w | | Tensile Strengths, (psi) Initial | | | Crosslinked | | |
|---|---|---|---|---|---|---|---|---|
| Sample | Initial[a] | Crosslinked | 25° C. | 71° C. | 100° C. | 25° C. | 71° C. | 100° C. |
| Polymer A | 9 | 44 | 3350 | 860 | 180 | 3160 | 890 | 185 |
| Control A | — | — | 3690 | 420 | 115 | 3540 | 440 | 135 |

TABLE 2-continued

| Sample | Gel Content, % w | | Tensile Strengths, (psi) | | | | | |
|---|---|---|---|---|---|---|---|---|
| | | | Initial | | | Crosslinked | | |
| | Initial[a] | Crosslinked | 25° C. | 71° C. | 100° C. | 25° C. | 71° C. | 100° C. |
| Control B | 0 | 40 | 3210 | 395 | 110 | 3360 | 820 | 150 |

[a] After filtration of high molecular weight species and film formation

While the present invention has been described and illustrated by reference to particular embodiments thereof, it will be appreciated by those of ordinary skill in the art that the same lends itself to variations not necessarily illustrated herein.

What is claimed is:

1. A functionalized, selectively hydrogenated block copolymer said copolymer comprising:
   (a) at least one alkenyl arene polymer block A and
   (b) at least one substantially completely hydrogenated conjugated diene polymer block B,
   (c) wherein silicon or boron containing compounds containing at least one moisture curing functional group are grafted to said copolymer substantially on said A blocks.

2. The copolymer according to claim 1, wherein the grafted silicon or boron containing compounds are present on the average in an amount from about one of said compounds per molecule of the block copolymer to about one of said compounds per aromatic ring of said A block.

3. A functionalized, selectively hydrogenated block copolymer to which has been grafted a silicon containing compound, said copolymer comprising:
   (a) at least one alkenyl arene polymer block A and
   (b) at least one substantially completely hydrogenated conjugated diene polymer block B,
   (c) wherein silicon containing compounds containing at least one moisture curing functional group are grafted to said copolymer substantially on said A blocks.

4. The copolymer according to claim 3, wherein the grafted silicon containing compounds are present on the average in an amount from about one of said silicon containing compounds per molecule of the block copolymer to about one of said silicon containing compounds per aromatic ring of said A block.

5. The copolymer according to claim 3, wherein the silicon containing compound contains at least one alkoxy group, acetoxy group, or oximido-containing group.

6. The copolymer according to claim 3, wherein the silicon containing compound contains at least two alkoxy groups.

7. The copolymer according to claim 6, wherein the alkoxy groups are either methoxy groups or ethoxy groups.

8. The copolymer according to claim 6, wherein the functionalized block copolymer is crosslinked by a condensation reaction.

9. The copolymer according to claim 3, wherein
   (a) each of said A blocks is predominantly a polymerized monoalkenyl monocyclic arene block having an average weight of about 1,000 to about 125,000,
   (b) each of said B blocks prior to hydrogenation is predominantly a polymerized conjugated diene block having an average molecular weight of about 10,000 to about 450,000,
   (c) said A blocks constituting about 1 to about 99 percent by weight of said copolymer,
   (d) the residual ethylenic unsaturation of said B block, is less than about 10 percent of the ethylenic unsaturation of said B blocks prior to hydrogenation, and
   (e) the residual aromatic unsaturation of said A blocks is greater than about 50 percent of the aromatic unsaturation of said A block prior to hydrogenation.

10. The copolymer according to claim 4, wherein prior to hydrogenation:
    (a) said A block is polymerized styrene and
    (b) said B block is selected from the group consisting of polymerized isoprene, polymerized butadiene, and polymerized isoprene and butadiene copolymer.

11. The copolymer according to claim 10, wherein said B block is polymerized butadiene block having 1,2 content of between about 35 percent and about 55 percent.

12. The copolymer according to claim 11, wherein the residual ethylenic unsaturation of said polymerized butadiene block is less than 5 percent of the ethylenic unsaturation present prior to hydrogenation.

13. The copolymer according to claim 11, wherein the residual ethylenic unsaturation of said polymerized butadiene block is at most 2 percent of the ethylenic unsaturation present prior to hydrogenation.

14. A functionalized, selectively hydrogenated block copolymer to which has been grafted a silicon containing compound, said copolymer comprising:
    (a) at least two alkenyl arene polymer blocks A and
    (b) at least one substantially completely hydrogenated conjugated diene polymer block B,
    (c) wherein said B block is between said two A blocks, and
    (d) wherein silicon containing compounds containing at least one moisture curing functional group are grafted to said copolymer substantially on said A blocks.

15. The copolymer according to claim 14, wherein said copolymer has a linear structure.

16. The copolymer according to claim 14, wherein said copolymer has a branched structure.

17. The copolymer according to claim 14, wherein the grafted silicon containing compounds are present on the average in an amount from about one of said silicon containing compounds per molecule of the block copolymer to about one of said silicon containing compounds per aromatic ring of said A block.

18. The copolymer according to claim 14, wherein
    (a) each of said A blocks prior to hydrogenation is predominately a polymerized monoalkenyl monocyclic arene block having an average molecular weight of about 1,000 to about 125,000,
    (b) each of said B blocks prior to hydrogenation is predominantly a polymerized conjugated diene block having an average molecular weight of about 10,000 to about 450,000,
    (c) said A blocks constituting about 1 to about 99 percent by weight of said copolymer, (d) the residual ethylenic unsaturation of said B block, is less than about 5 percent of the ethylenic unsaturation of said B blocks prior to hydrogenation, and
(e) the residual aromatic unsaturation of said A blocks is greater than about 50 percent of the aromatic unsaturation of said A block prior to hydrogenation.

19. The copolymer according to claim 18, wherein prior to functionalization said copolymer is a polystyrene-poly(ethylene/butylene)polystyrene block copolymer.

20. The copolymer according to claim 19, wherein on the average the residual ethylenic unsaturation of said B blocks is at most about 2 percent of the ethylenic unsaturation of said B blocks prior to hydrogenation.

* * * * *